United States Patent
Fujihara

(10) Patent No.: US 6,268,971 B1
(45) Date of Patent: Jul. 31, 2001

(54) CAMERA HAVING MAGNETIC HEAD AND NOISE DETECTOR

(75) Inventor: Yuji Fujihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/236,728

(22) Filed: Jan. 25, 1999

(30) Foreign Application Priority Data

Jan. 30, 1998 (JP) .................................................. 10-034222

(51) Int. Cl.$^7$ ...................................................... G11B 5/00
(52) U.S. Cl. ................... 360/1; 360/3; 360/137; 360/72.1; 396/319
(58) Field of Search ..................................... 396/314, 312; 369/69, 70; 360/3, 137, 72.1, 25, 73.04, 1

(56) References Cited

U.S. PATENT DOCUMENTS 5,787,315 * 7/1998 Tanaka et al. ...................... 360/1 X

* cited by examiner

Primary Examiner—Alan T. Faber
(74) Attorney, Agent, or Firm—Robin, Blecker & Daley

(57) ABSTRACT

An unexposed-frame determining apparatus which determines an unexposed frame by reproducing magnetic information recorded on a film, includes a magnetic information reproducing device which reproduces magnetic information recorded on the film, and a magnetic noise determining device which determines a state of magnetic noise obtained while the magnetic information reproducing device is reproducing magnetic information at a space between adjacent frames of the film.

8 Claims, 10 Drawing Sheets

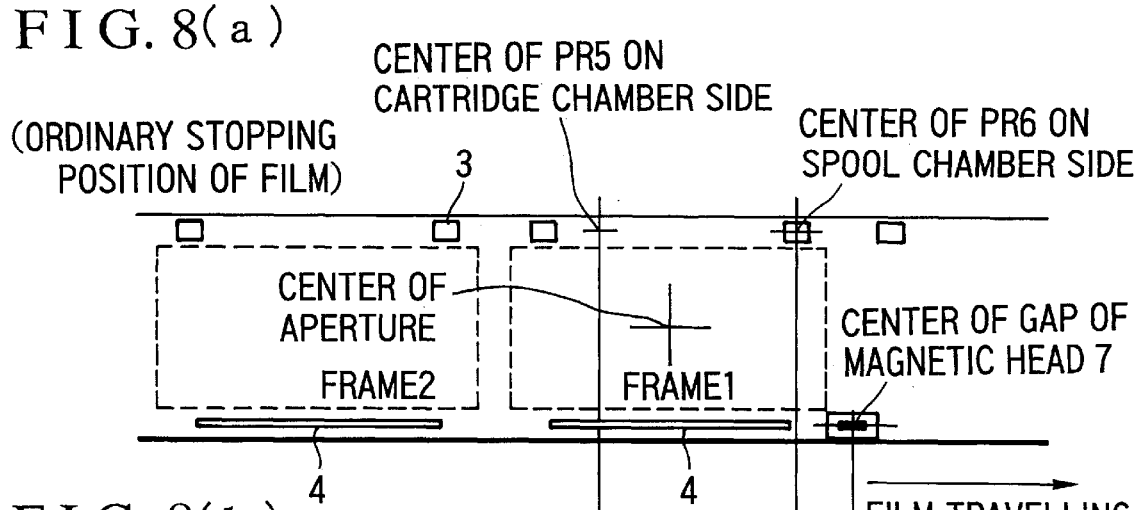
FIG. 8(a) (ORDINARY STOPPING POSITION OF FILM)
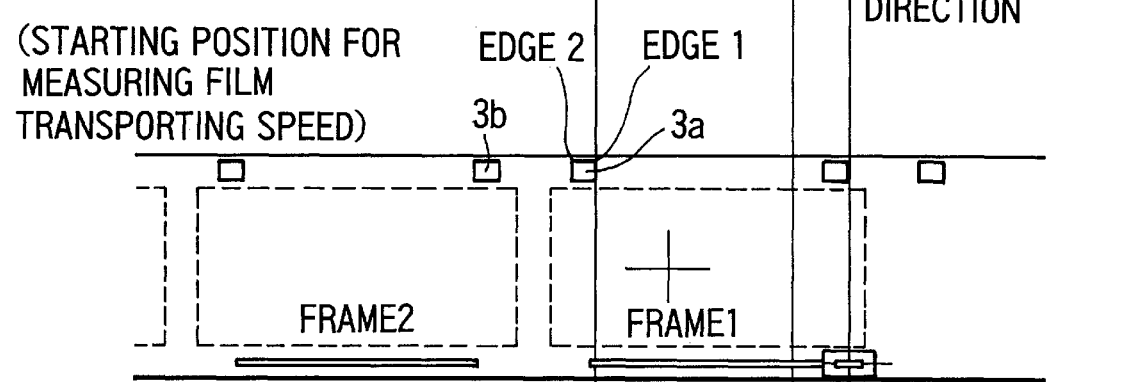
FIG. 8(b) (STARTING POSITION FOR MEASURING FILM TRANSPORTING SPEED)
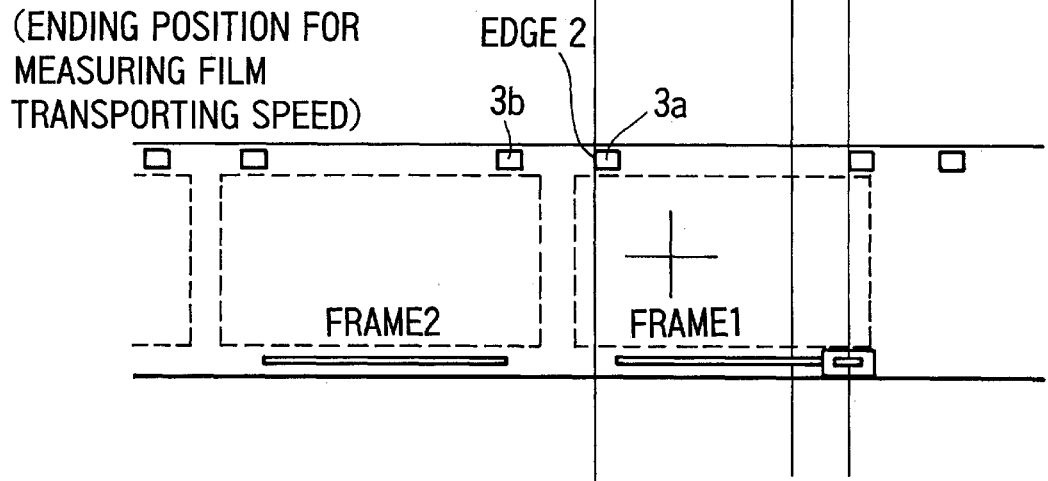
FIG. 8(c) (ENDING POSITION FOR MEASURING FILM TRANSPORTING SPEED)

(STARING POSITION FOR MEASURING MAGNETIC SIGNAL)

(ENDING POSITION FOR MEASURING MAGNETIC SIGNAL)

(STARING POSITION FOR MEASURING NOISE AT SPACE BETWEEN FRAMES)

(ENDING POSITION FOR MEASURING NOISE AT SPACE BETWEEN FRAMES)

CAMERA HAVING MAGNETIC HEAD AND NOISE DETECTOR

BACKGROUND OF THE INVENTION

1. Field of the Invention

The present invention relates to an improvement on a camera of the kind having a frame-position detecting means arranged such that, when the camera is loaded with a film cartridge containing a half-way exposed film therein, the frame-position detecting means detects the leader position of unexposed frames of the film during transportation of the film from the film cartridge by actuating a reproducing means to detect the presence or absence of magnetic signals and automatically sets an unexposed frame at a predetermined photographable position.

2. Description of Related Art

Cameras of the kind having a magnetic head and arranged to be capable of recording, with the magnetic head, data of varied kinds at a predetermined position of a magnetic recording layer provided at every photo-taking frame of a film have been commercialized during recent years. The data thus magnetically recorded is read at a photofinishing laboratory while the film is in process of printing, and is then used either as reference data for improvement in quality of prints or is printed on the surface or reverse side of printing paper.

In addition to the above-stated usage, the magnetic data is used also for detecting a boundary position between an unexposed frame and an exposed frame in a case where a film cartridge which is taken out from a camera in a half used state before complete use thereof is to be used later for further photographing. The magnetic data is usable for this purpose, because the magnetic data is normally recorded at a predetermined position at each exposed frame. Therefore, the boundary position between an unexposed frame and an exposed frame can be detected by searching for the presence or absence of the magnetic data by means of the above-stated magnetic head. A leader position searching (detecting) function is carried out in this manner. Hereinafter, this function will be called an MRC (Mid Roll Change) function.

However, accurate detection of the presence or absence of the magnetic data is sometimes hindered by the intrusion of a noise into the magnetic head and a magnetic signal detecting part or circuit due to some external factor while execution of the MRC function is in process.

BRIEF SUMMARY OF THE INVENTION

In accordance with one aspect of the invention, there is provided an unexposed-frame determining apparatus which determines an unexposed frame by reproducing magnetic information recorded on a film, which comprises a magnetic information reproducing device which reproduces magnetic information recorded on the film, and a magnetic noise determining device which determines a state of magnetic noise obtained while the magnetic information reproducing device is reproducing magnetic information at a space between adjacent frames of the film, so that an unexposed frame of the film can be accurately determined.

The above and other aspects of the invention will become apparent from the following detailed description of a preferred embodiment thereof taken in connection with the accompanying drawings.

BRIEF DESCRIPTION OF THE SEVERAL VIEWS OF THE DRAWING

FIGS. 8(a) to 8(c) are illustrations aiding in explaining a film-transporting-speed measuring process to be executed in the embodiment of the invention.

DETAILED DESCRIPTION OF THE INVENTION

Hereinafter, a preferred embodiment of the invention will be described in detail with reference to the drawings.

Figure 1:
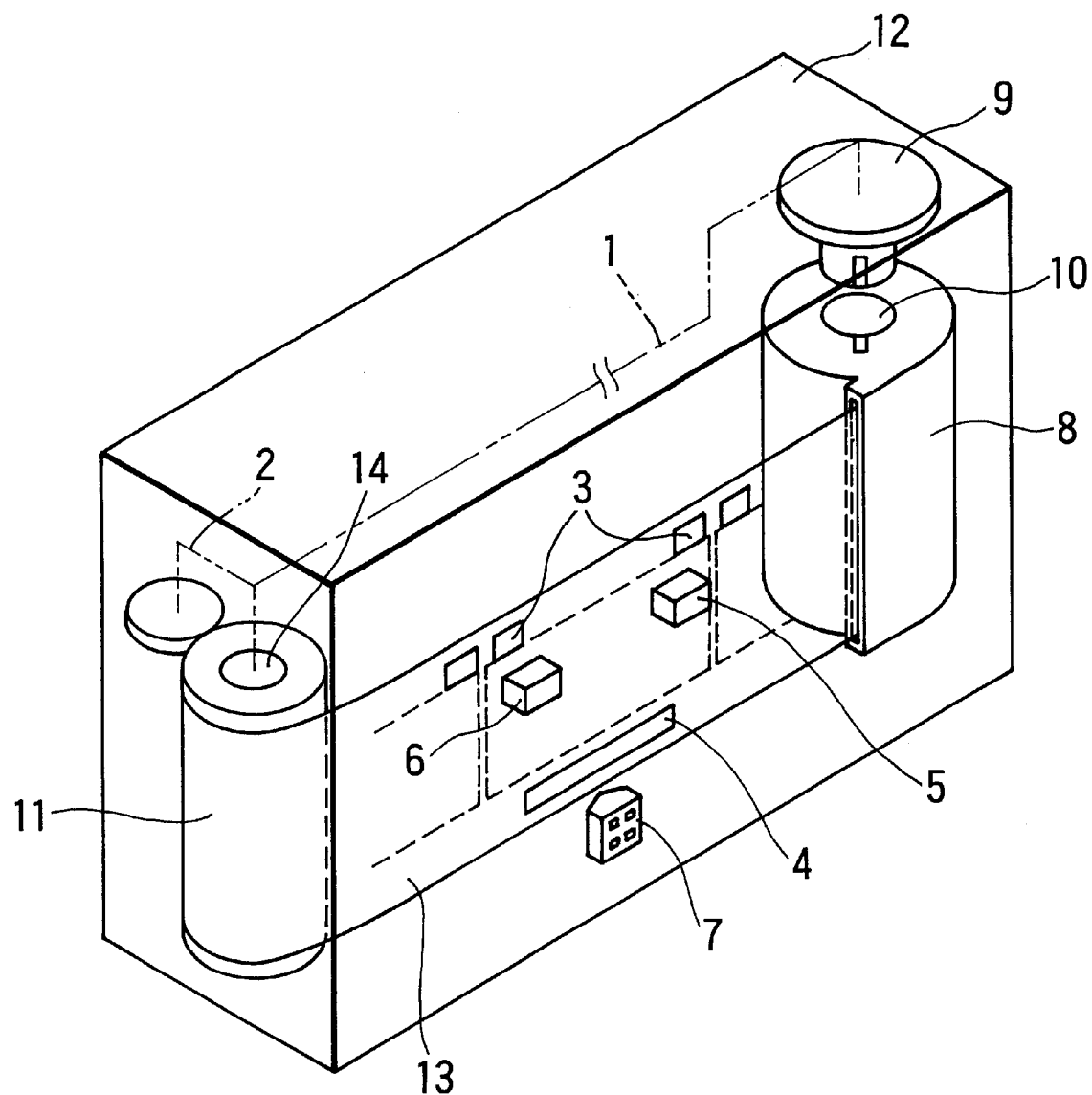
FIG. 1 is a perspective view showing portions related to a film transport system of a camera according to an embodiment of the invention.

FIG. 1 is a perspective view showing a film transport system of a camera according to the embodiment of the invention. The camera has a take-up spool 11 formed at its one end part and a cartridge chamber, into which to load a film cartridge 8, at the other end part across an aperture part. A film 13 which is provided with a magnetic recording layer thereon is wound around a spool shaft 10 disposed within the film cartridge 8. The two ends of the film cartridge 8 are pinched by thin elastic resin disks (not shown) called "thrust engine". A cutout part provided in the fore end of the film 13 is hooked on the disk in such a way as to prevent the film 13 from being completely pulled into the film cartridge 8.

Referring to FIG. 1, the upper end part of the spool shaft 10 within the film cartridge 8 engages a rotary fork 9. The rotary fork 9 is connected to a single transport motor 14 through a drive transmitting mechanism 1 (which is indicated by a two-dot chain line). The take-up spool 11 is connected to the transport motor 14 through a drive transmitting mechanism 2 (which is indicated by a two-dot-chain line). The take-up spool 11 and the spool shaft 10 are thus interlocked to be driven by the transport motor 14 at the respective speeds which are in a certain speed ratio. When the transport motor 14 normally rotates, the spool shaft 10 begins to rotate. The above-stated thrust engine then causes the fore end of the film 13 to be pushed out from a light-lock door (light-shielding door) of the film cartridge 8 and to be moved forward until it is taken up and wound on the take-up spool 11 which is also driven in the interlocked state. After that, the rotation of the take-up spool 11, which is faster than the rotation of the spool shaft 10, changes the state of the film 13 from a state of being under a feeding force over to a state of being under a pulling force of a film winding transport action. At this time, a difference in film feeding amount due to the ratio between the different rotation speeds is arranged to be absorbed by means of a one-way clutch (not shown) which is disposed within the drive transmission system (drive transmitting mechanism) of the motor 14.

When the transport motor 14 reversely rotates, the rotary fork 9 reversely rotates to cause the spool shaft 10 to rotate in the direction of film rewinding. The film 13 is wound back into the film cartridge 8. The take-up spool 11 then becomes freely rotatable as it is disconnected from the drive transmission system of the motor 14 by a planet gear (not shown) of the transmission system. This arrangement effectively precludes a stretched state of the film 13.

The film 13 is provided with perforations 3 which are arranged along one edge of the film 13 in such a way as to define two ends of each frame portion of the film 13. Photo-reflectors 5 and 6 are arranged to detect the position of the perforations 3 and send a detection signal. The detection signal is used for control over film transport actions as will be described later. The film 13 is provided further with a magnetic recording layer which is arranged to have such a low density that brings about no adverse effect on the quality of image. In winding an exposed frame, magnetic data of photo-taking information corresponding to the exposed frame is written by a magnetic head 7 in the magnetic layer along the other edge of the film 13. The part of the film 13 where the magnetic data is thus recorded is indicated as a magnetic recording part 4 in FIG. 1. In performing the MRC action mentioned in the foregoing, the magnetic data is read by the magnetic head 7 out from the magnetic recording part 4.

The magnetic recording part 4 in which the magnetic data is written is thus formed for each exposed frame, as shown in FIG. 1. For each frame which has not been exposed as yet (unexposed), i.e., not used for photo-taking, magnetic data is not written, so that the magnetic recording part 4 does not contained magnetic data. Therefore, a boundary position between an exposed frame and an unexposed frame can be found by detecting the presence or absence of the magnetic data, i.e., the magnetic recording part 4. In other words, a leader frame among unexposed frames thus can be automatically set in an aperture position (a leader bring-over action).

Figure 2:
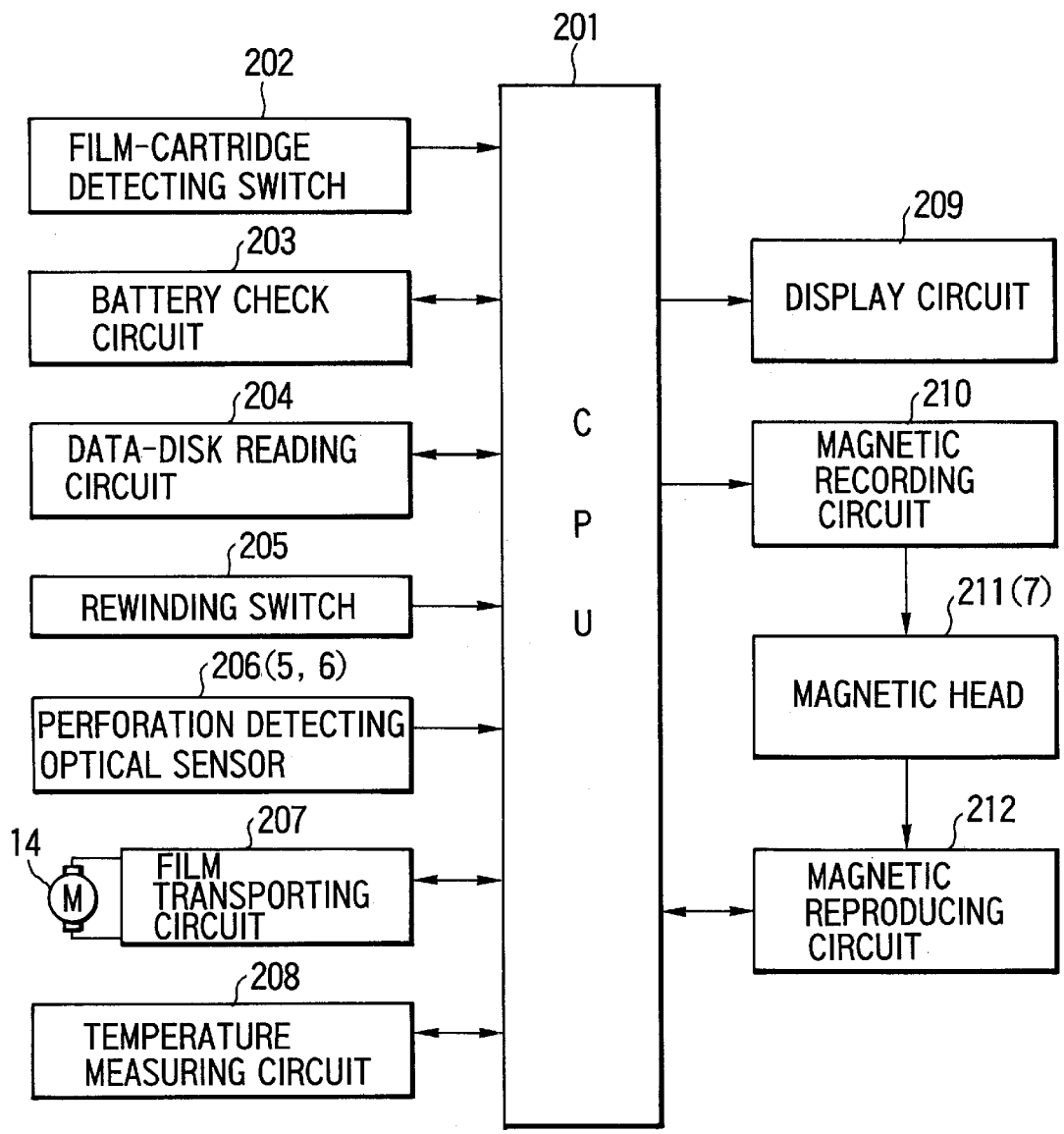
FIG. 2 is a block diagram showing the electrical arrangement of essential parts of the camera according to the embodiment of the invention.

FIG. 2 is a block diagram showing the electrical arrangement of essential parts of the camera arranged as described above. All parts of the camera not directly related to the invention are omitted from the illustration of FIG. 2.

Referring to FIG. 2, a CPU 201 which is composed of a microcomputer, etc., is arranged to measure a noise and a film transporting speed, as will be described later, besides performing control over circuits of varied kinds. A film-cartridge detecting switch 202 is arranged in a known manner to detect whether or not the film cartridge 8 is placed inside the cartridge chamber. A battery check circuit 203 is provided for making a check for the state of the battery of the camera, i.e., for a power supply voltage. A data-disk reading circuit 204 is arranged to read a film-using state indication, such as an unused state, an exposed state and a halfway (partially) exposed state, etc., and is also to be used in setting a film state after completion of a film rewinding action. This setting action hereinafter will be called "VEI setting". A rewinding switch 205 is provided for instructing the camera to rewind the film 13 while the film 13 is used only halfway. A perforation detecting optical sensor 206 corresponds to the photo-reflectors 5 and 6 shown in FIG. 1 and is arranged to detect the perforations 3 formed in the film 13.

A film transporting circuit 207 is arranged to drive the transport motor 14 to wind and rewind the film 13. A temperature measuring circuit 208 is arranged to measure exterior temperature when the camera is in operation. Normally, a light measuring sensor included in the camera is used for this purpose. A display circuit 209 which is composed of liquid crystals, etc., is arranged to display photo-taking information of varied kinds and also to give various warnings, such as a warning given when the battery is in an inadequate state. A magnetic recording circuit 210 is arranged to record magnetic data to form the magnetic recording part 4 on the film 13 by driving a magnetic head 211, which corresponds to the magnetic head 7 shown in FIG. 1. A magnetic reproducing circuit 212 is arranged to read magnetic data (a magnetic signal) out from the magnetic recording part 4 by driving the magnetic head 211.

The details of arrangement of the magnetic reproducing circuit 212 are as follows. As shown in FIG. 2, the magnetic reproducing circuit 212 is connected to the magnetic head 211 and is composed of an amplifying circuit, a cut-off filter and a comparator which are not shown. The magnetic signal written in the magnetic recording part 4 is read out in the form of extremely low voltages by the magnetic head 211 (7). The magnetic signal read out is amplified up to a suitable level by the amplifying circuit. Noises in the amplified signal are cut off by the cut-off filter. After that, the signal is converted into a logic signal by the comparator. The logic signal thus obtained is supplied to the CPU 201.

It is generally difficult to read out a magnetic signal at a sufficient level, in a camera, due to the state of contact between a film and a magnetic head (such as their relative angles and the unevenness of the magnetic head with respect to a pressure plate on which the magnetic head is mounted), a positional deviation in the direction of width of the film, variations in film transporting speed, existence of jitter, etc. However, it is possible to detect the presence or absence of a magnetic signal by detecting the magnitude of a reproduced output.

The operation of the CPU 201 in respect of parts related to the invention is next described in detail below with reference to FIGS. 3 to 7 which are flow charts showing flows of operation of the CPU 201, together with FIGS. 8(a) to 10(c) through FIGS. 10(a) to 10(c) which are timing charts.

Figure 3:
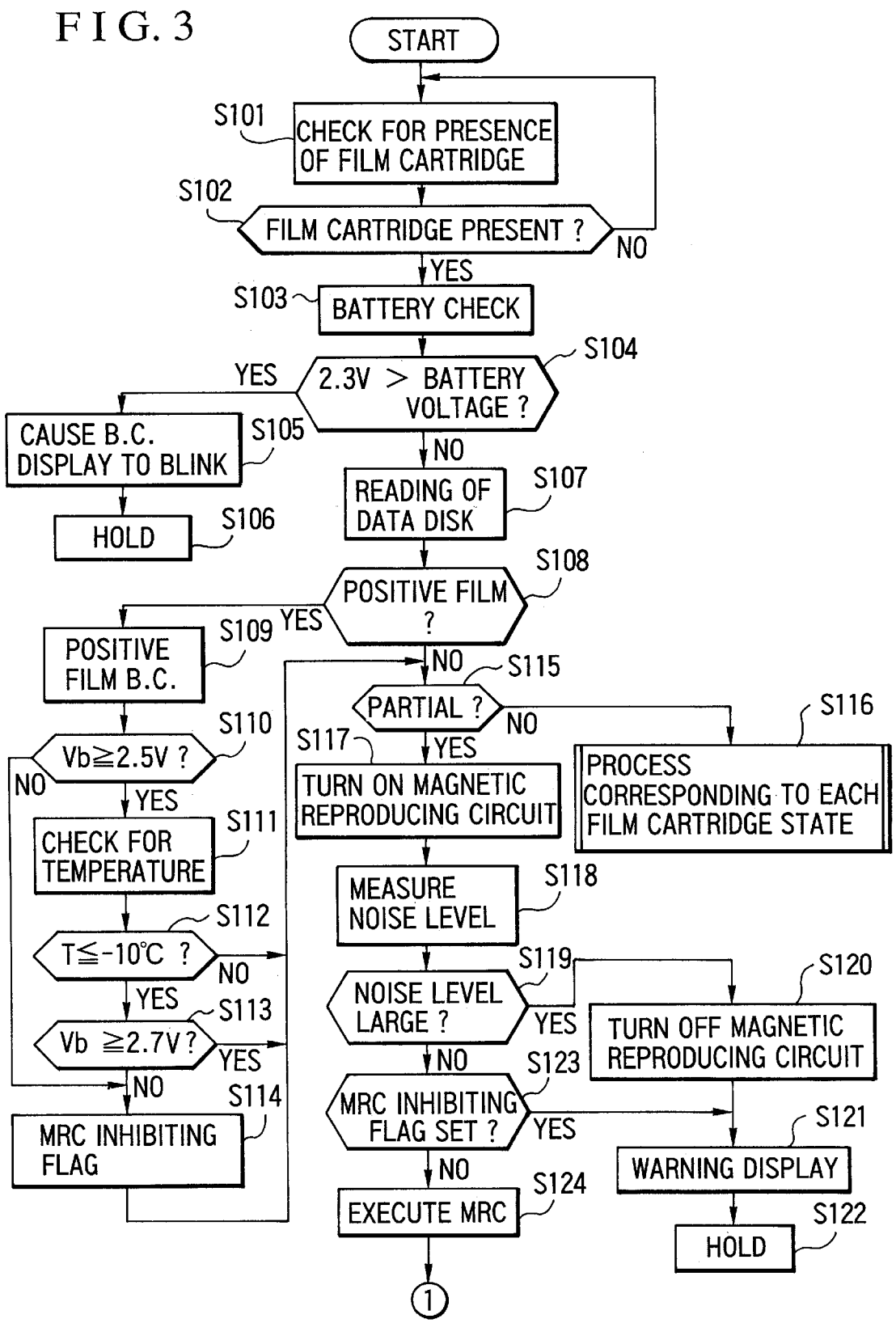
FIG. 3 is a flow chart showing a flow of operation of essential parts of the camera according to the embodiment of the invention.

Referring to FIG. 3, the position of the film-cartridge detecting switch 202 is read at a step S101. At the next step S102, a check is made to find if the film cartridge 8 is present inside the cartridge chamber. If not, the flow of operation returns to the step S101 to read again the position of the film-cartridge detecting switch 202. The steps S101 and S102 are repeated until the camera is found at the step S102 to have been loaded with the film cartridge 8.

When the film cartridge 8 is found at the step S102 to be present, the flow proceeds to a step S103. At the step S103, the battery check circuit 203 is driven to make a battery check (indicated as B.C. in the flow chart) and to find a battery voltage (hereinafter, the battery voltage is sometimes referred to as a battery check voltage Vb). At the next step S104, a check is made to find if the battery check voltage Vb is lower than a predetermined voltage which is, for example, 2.3 V and is not sufficient for execution of subsequent steps. If so, the flow proceeds from the step S104 to a step S105. At the step S105, the display circuit 209 is caused to make a warning display (a flickering display) which urges the operator of the camera to replace the battery with a new battery. At the next step S106, the camera is set into a hold state HOLD, which means a state in which the CPU 201 (microcomputer) is in a power saving mode. In the power saving mode, the CPU 201 accepts no instructions from any of operation members except, for example, an instruction from the rewinding switch 205.

If the battery voltage is found at the step S104 to be higher than the predetermined voltage which is, for example, 2.3 V, the flow of operation proceeds from the step S104 to a step S107. At the step S107, the transport motor 14 is caused, through the film transporting circuit 207, to reversely rotate. This causes the spool shaft 10 within the film cartridge 8 to rotate in the direction of film rewinding. At the same time, the data-disk reading circuit 204 is driven to read out from a data disk provided on the film cartridge 8 information about the used state of the film, the kind of the film, i.e., a positive film or a negative film, etc. After the information is read out, the transport motor 14 is temporarily brought to a stop in an initial film using position.

At the next step S108, a check is made to find if the film is a positive film. If not, i.e., if the film is a negative film, the flow proceeds to a step S115. If so, the flow proceeds to a step S109. At the step S109, a predetermined inhibiting voltage value which is stored for battery check, for example, 2.5 V, is read out from an EEPROM (not shown) or the like. This inhibiting voltage is set for battery check at a value higher than the voltage (2.3 V, for example) used at the step S104 for the positive film, because the threshold value of noise level varies with the kind of the film. Generally, the output level of a reproduced magnetic signal obtained from a positive film is lower than that of a reproduced magnetic signal obtained from a negative film. Therefore, a film transporting speed must be increased accordingly.

At a step S110, the battery check voltage Vb is compared with the inhibiting battery check voltage "2.5 V". If the battery check voltage Vb is found to be lower, it is impossible to ensure a sufficient film transporting speed. The flow, therefore, proceeds to a step S114 to set up an MRC inhibiting flag. The flow then proceeds from the step S114 to a step S115.

If the battery check voltage Vb is found at the step S110 to be higher than the inhibiting voltage thus ensuring a predetermined film transporting speed, the flow proceeds to a step S111. At the step S111, the temperature measuring circuit 208 is driven to measure the temperature of environment in which the camera is used. The step S111 is provided, because a load on film transport tends to increase under a low temperature and, in order to ensure a predetermined film transporting speed, safety measures must be taken by subsequent steps. After completion of the temperature measuring action, i.e., a temperature check, the flow proceeds to a step S112. At the step S112, a check is made to find if the current temperature is higher than a predetermined temperature which is, for example, −10° C. If so, the flow proceeds to the step S115, as there is no problem. If not, the flow proceeds from the step S112 to a step S113. At the step S113, to ensure an adequate film transporting speed even under such environment, the battery check voltage Vb is compared with the higher inhibiting voltage of 2.7 V to find if the voltage Vb is equal to or higher than the inhibiting voltage of 2.7 V. If so, the flow proceeds to the step S115 as the battery voltage ensures a predetermined film transporting speed. If not, the film transporting speed is hardly assurable and, therefore, the flow proceeds to the step S114 to set up the MRC inhibiting flag. After that, the flow proceeds from the step S114 to the step S115.

At the step S115, a check is made to find if the used state of the film 13 read at the step S107 indicates that the film 13 is in a halfway exposed state, i.e., a partial used (exposed) state. If not, the flow proceeds to a step S116. At the step S116, a process applicable to the state of the film is executed. If the film is found at the step S115 to be in a halfway exposed state, the flow proceeds from the step S115 to a step S117. At the step S117, the magnetic reproducing circuit 212 is turned on. At the next step S118, a noise level is measured to examine a noise (generating) environment by turning the magnetic reproducing circuit 212 on, without transporting the film, and by examining the level of noises included in the reproduced output of the magnetic head 7. As apparent from the foregoing description, the threshold value of noise level varies according to whether the film in use is a positive film or a negative film, and the reproduced magnetic signal output level of a negative film is higher than that of a positive film in general. The noise level threshold value thus can be set at a higher value for a negative film than for a positive film. Therefore, at the next step S119, if the film is found to be a negative film, the noise level threshold value is set at a higher value than in the case of a positive film. If not, a noise level threshold value suited for a positive film is read out from an EEPROM or the like (not shown) and is compared with a noise level found at the step S118.

If the noise level is found by the comparison of the step S119 to exceed the threshold value, the flow proceeds to a step S120. At the step S120, the magnetic reproducing circuit 212 is turned off. At a step S121, the display circuit 209 is driven to make a warning display showing that the current environment condition is not suited for the MRC function. At the next step S122, the camera is set into the hold state HOLD. If the noise level is found at the step S119 to be lower than the threshold value, the flow proceeds to a step S123.

At the step S123, a check is made to find if the MRC inhibiting flag is set up. If so (in the case of flowing through the step S114), the flow proceeds to the step S121, in which the display circuit 209 is driven to make a warning display showing that the current environment condition is not suited for the MRC function. At the next step S122, the camera is set into the hold state HOLD.

If the MRC inhibiting flag is found at the step S123 to be not set up, the flow proceeds to a step S124 to have the film transporting circuit 207 cause the transport motor 14 to make a normal rotation. In other words, the MRC function is allowed to begin by rotating the transport motor 14 in the film winding direction. The flow then proceeds from the step S124 to a step S125 shown in FIG. 4.

At the step S125, a noise level obtained while the transport motor 14 is in process of driving is measured. At the next step S126, a check is made again for the noise environment. If the noise level is found to exceed the noise level threshold value applicable to the film in use, the flow proceeds to a step S127. At the step S127, the magnetic reproducing circuit 212 is turned off. At the next step S128, the transport motor 14 is caused to make a reverse rotation to rewind the film. Upon completion of the process of film rewinding, the flow proceeds to a step S129. At the step S129, the film-using state indication is set to the halfway exposed state. In other words, the VEI setting action is performed. The film-using state indication is thus set to the halfway exposed state at the step S129 for the following reason. Although the current noise environment (a noise generating condition) does not allow the MRC function to be actuated at present, the MRS function may be allowed to be actuated under some other environment that differs from the current environment. At the next step S130, the display circuit 209 is driven to make a warning display indicating that the actuation of the MRC function is not allowed under the current environment condition. At a step S131, the camera is set into the hold state HOLD.

If the noise level is found at the step S126 to be less than the threshold value, the flow proceeds from the step S126 to a step S132. At the step S132, a check is made for a film transporting speed. The details of the step S132 are described below with reference to FIG. 7 which shows a subroutine of the film transporting speed check.

Figure 7:
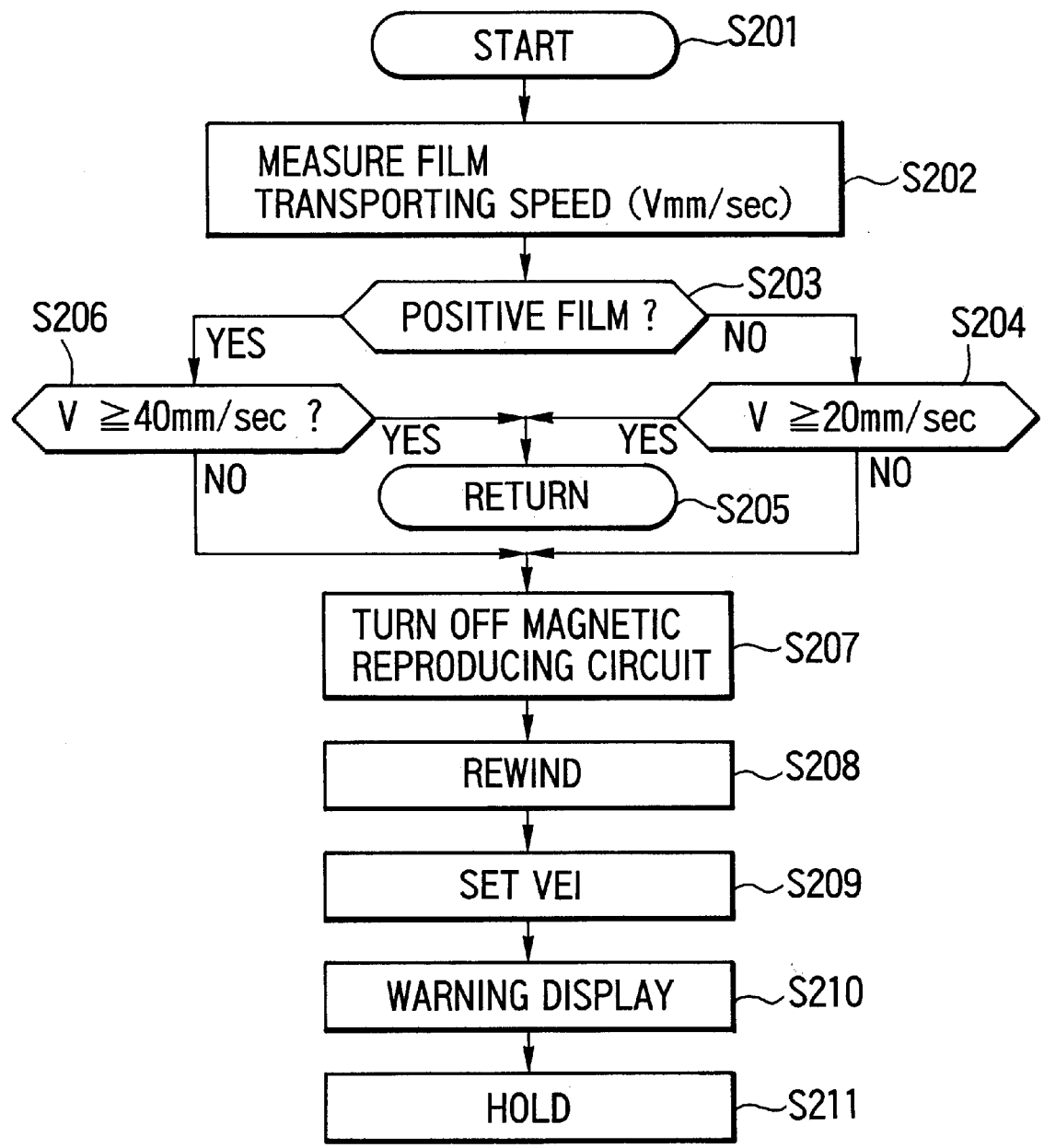
FIG. 7 is a flow chart showing the details of a film-transporting-speed checking process to be executed at a step S132 of FIG. 4 and a step S154 of FIG. 5.

When this subroutine is called at the step S132, the flow proceeds to a step S202 through a step S201 as shown in FIG. 7. At the step S202, the film transporting speed is measured. The film transporting speed is measured when the first perforation 3 (3a) of the film 13 passes through the photo-reflector (PR) located on the side of the cartridge chamber after the film 13 is sent out from the film cartridge 8 and wound on the take-up spool 11 which is located opposite to the film cartridge 8.

Figure 10A:
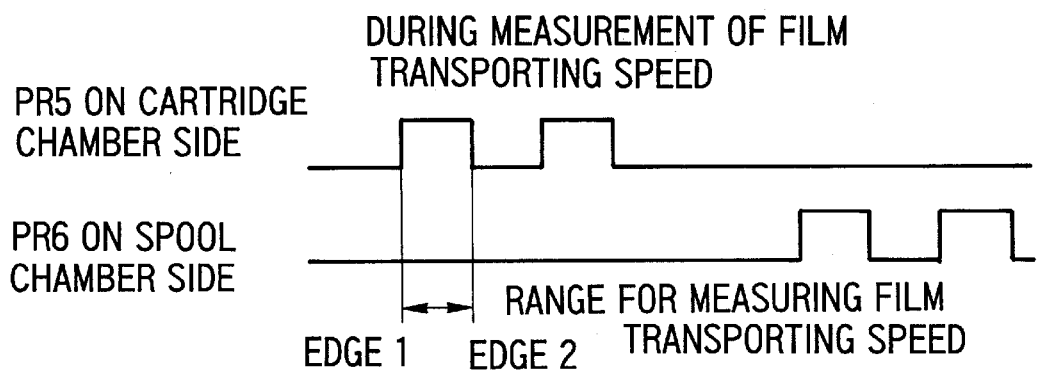
FIGS. 10(a) to 10(c) are illustrations aiding in explaining processes to be executed for measuring a film transporting speed, for measuring a magnetic signal and for measuring a noise at a space between adjacent frames in the embodiment of the invention.

FIGS. 8(b) and 8(c) show the positional relation among the perforations, the photo-reflectors and the magnetic head. FIG. 10(a) shows a film transporting speed measuring range. FIG. 8(a) shows the film as in its normal stopping position, at which the first frame FRAME 1 is located at the aperture position. In this case, the film transport for its speed measurement begins from this film position. When the film 13 in the position shown in FIG. 8(a) advances to be wound on the take-up spool 11 and, then, the edge 1 of the perforation 3a reaches the photo-reflector 5 disposed on the side of the cartridge chamber as shown in FIG. 8(b), a timer (not shown) is caused to start operating. After that, when the edge 2 of the perforation 3a reaches the position of the photo-reflector 5 as shown in FIG. 8(c), the timer is caused to stop operating for terminating the film transporting speed measuring action. In other words, a length of time required for moving the film 13 a distance between the edge 1 and the edge 2 of the perforation 3a as shown in FIG. 10(a) is counted. A film transporting speed Vmm/sec is then computed on the basis of the distance between the edges 1 and 2 of the perforation 3a which is known and the result of time count made by the timer.

With the film transporting speed computed in the manner as described above, the flow proceeds from the step S202 to a step S203. At the step S203, a check is made for the kind of the film 13, i.e., to find whether the film 13 is a positive film or a negative film. If the film 13 is found to be a negative film, the flow proceeds to a step S204. At the step S204, the above-stated speed Vmm/sec is compared with a first predetermined transporting speed which is, for example, 20 mm/sec. If the current film transporting speed is found to be slower than the predetermined transporting speed, a magnetic reproduction output cannot be obtained as desired because of the low film transporting speed and, then, a drop in S/N ratio might cause an exposed frame to be mistaken for an unexposed frame and erroneously brought over as a leader of unexposed frames in the search for a leader frame. In that instance, therefore, the flow proceeds from the step S204 to a step S207 to turn off the magnetic reproducing circuit 212. At the next step S208, the transport motor 14 is caused to reversely rotate for film rewinding. Upon completion of film rewinding, the flow proceeds to a step S209 to set the indication of using state of the film to the "halfway-exposed" state. In other words, a VEI setting action is performed. The reason for setting the film-using state indication to the "halfway exposed" state is as follows. Such a drop in film transporting speed might have resulted from some abnormality of the transport mechanism. The MRC function cannot be actuated in such a state. However, by carrying out the same speed measuring action once more again, the result of it might allow the MRC function to be actuated. At the next step S210, the display circuit 209 is caused to make a warning display indicating that the MRC function cannot be actuated under the present state of environment. At a step S211, the camera is set into the hold state HOLD. Further, if the current film transporting speed is found at the step S204 to be faster than the predetermined transporting speed, i.e., if the film transporting speed is sufficient for detection of magnetic signals, the flow proceeds to a step S133 of FIG. 4 through a step S205.

If the film 13 in use is found at the step S203 to be a positive film, the flow proceeds from the step S203 to a step S206. At the step S206, the above-stated current film transporting speed Vmm/sec is compared with a second predetermined transporting speed which is, for example, 40 mm/sec and is higher than the first predetermined transporting speed because of the reason a mentioned in the foregoing. If the current transporting speed is found to be slower than the second predetermined transporting speed, the flow proceeds to the step S207 to execute the steps S207 to S211 to set the camera in the hold state in the same manner as in the case of the negative film. If the current transporting speed is found at the step S206 to be faster than the second predetermined transporting speed, i.e., if the current transporting speed is sufficient for detection of magnetic signals, the flow proceeds to the step S133 of FIG. 4 through the step S205.

Figure 9A:
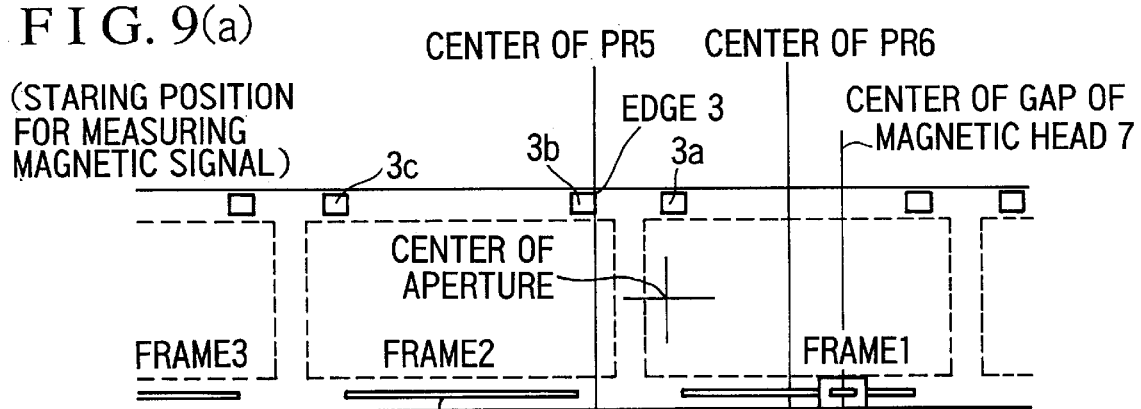
FIGS. 9(a) to 9(d) are illustrations aiding in explaining processes to be executed for measuring a magnetic signal and for measuring a noise at a space between adjacent frames in the embodiment of the invention.
Figure 9B:
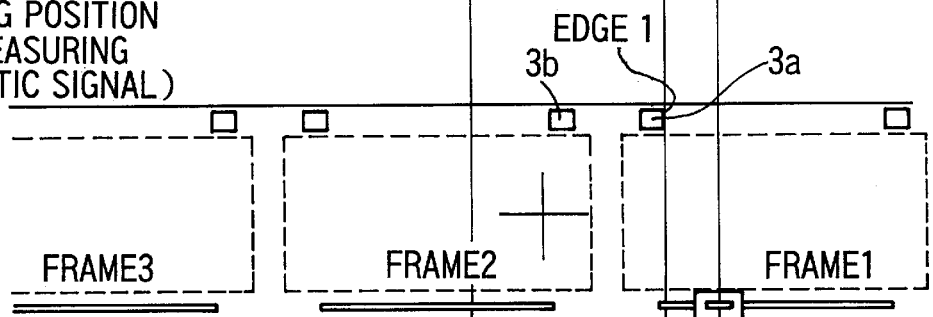
Figure 10B:
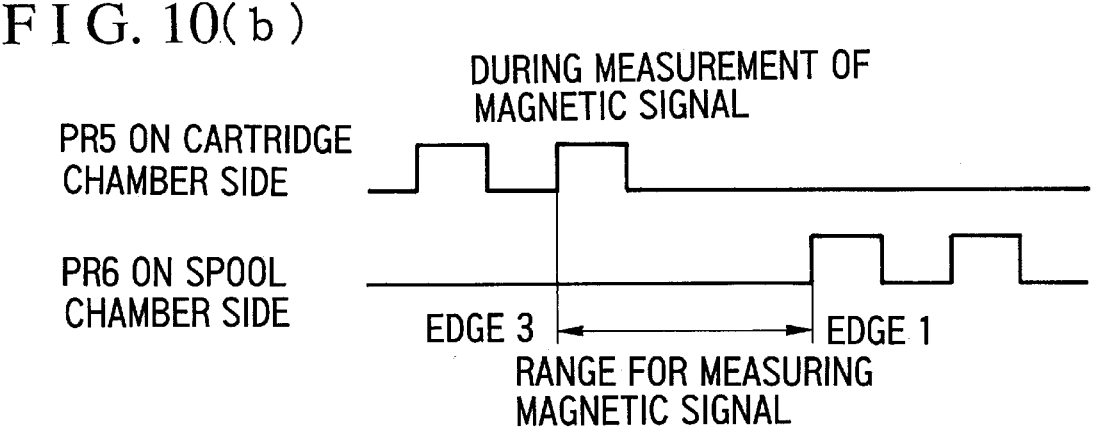

Referring again to FIG. 4, at the step S133, a check is made for a magnetic signal. More specifically, the check is made for the presence or absence of a magnetic signal during a period from a point of time at which the photo-reflector 5 on the side of the cartridge chamber detects the edge 3 of the second perforation 3b as shown in FIG. 9(a) until the edge 1 of the perforation 3a reaches the photo-reflector 6 disposed on the side of the spool chamber as shown in FIG. 9(b), i.e., a period corresponding to one frame portion of the film 13, also as shown in FIG. 10(b). The range of making the check for a magnetic signal is arranged to be within a predetermined length of the magnetic recording part 4 and to cover the range of magnetic recording without fail. In a case where the film cartridge having a magnetic recording layer on the film has its film-using state indication at its data disk indicating the "halfway exposed" date, each exposed frame, as a rule, must have some magnetic signal recorded there. Therefore, after the step S133, if no magnetic signal is found at the next step S134, the flow proceeds to a step S135 to turn off the magnetic reproducing circuit 212. At a step S136, the transport motor 14 is caused to reversely rotate to rewind the film. After completion of film rewinding, the flow proceeds to a step S137 to set the film-using state indication to an "exposed state" (the VEI setting). The film-using state indication is set to the "exposed" state because, in this case, the film cartridge which has no magnetic signal at its first frame is an abnormal film cartridge. The flow proceeds from the step S137 to a step S138 to cause the display circuit 209 to make a warning display. At a step S139, the camera is set into the hold state HOLD.

Further, if a magnetic signal is found at the step S134 to be present, the flow proceeds from the step S134 to a step S140. At the step S140, a check is made for the frame number of the current frame. At the next step S141, a check is made to find if the current frame is the last frame. The current frame is of course not the last frame at first. The flow then proceeds from the step S141 to a step S147 shown in FIG. 5. At the step S147 of FIG. 5, the level of noise at a space between adjacent frames is measured as described in detail below.

Figure 9C:
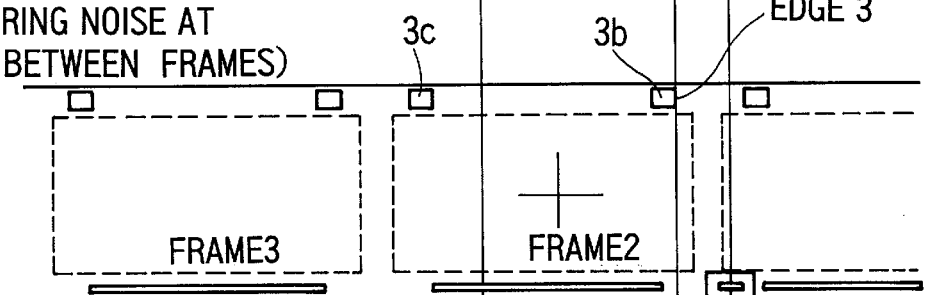
Figure 9D:
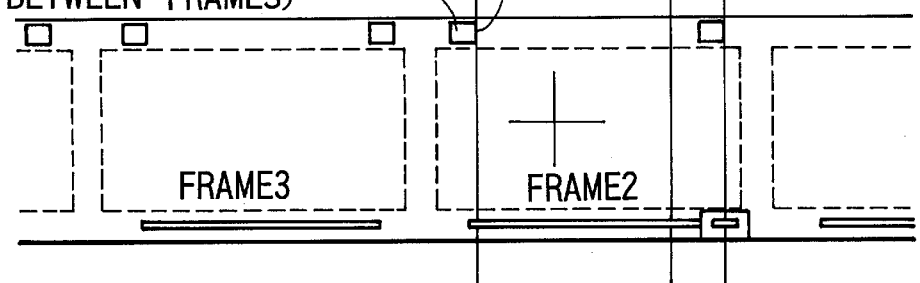
Figure 10C:
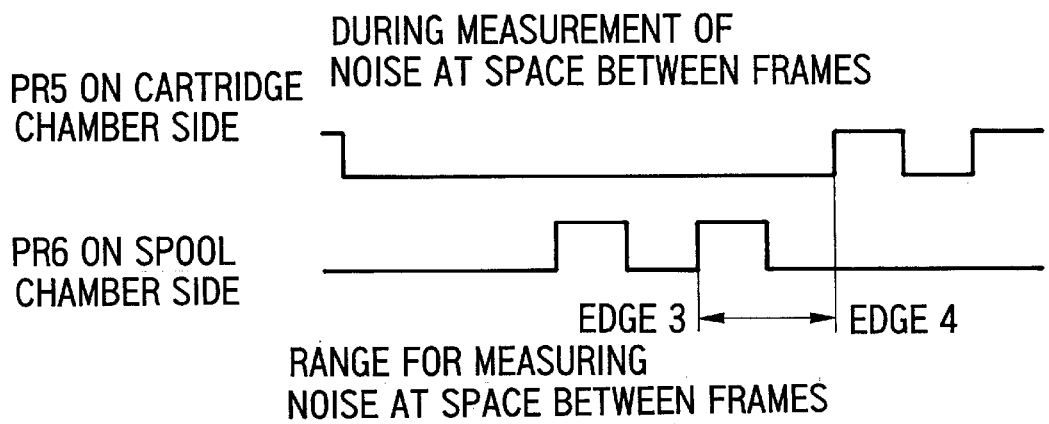

A noise level measuring action is performed during a period of time after the edge 3 of the second perforation 3b is detected by the photo-reflector 6 on the side of the spool chamber as shown in FIG. 9(c) until the edge 4 of the third perforation 3c is detected by the photo-reflector 5 on the side of the cartridge chamber as shown in FIG. 9(d), i.e., at a space between adjacent frames as shown in FIG. 10(c). Generally, there is no magnetic signal within this space.

At the next step S148, the noise level measured at a space between adjacent frames at the step S147 is compared with the noise level measured at the step S125 immediately after the actuation of the MRC function. If the noise level at a space between adjacent frames is found to be higher, it is considered that the noise environment of the camera has aggravated after the process of operation of the MRC function, and the flow proceeds to a step S149. At the step S149, the magnetic reproducing circuit 212 is turned off. At the next step S150, the transport motor 14 is caused to reversely rotate to rewind all frame portions of the film. At a step S151, after the film rewinding, the film-using state indication is set to the "halfway exposed" state, i.e., the VEI setting action is performed. In this instance, the film-using state indication (the data disk of the film cartridge) is set to the "halfway exposed" state because, although the noise environment of the camera is considered to have aggravated after the process of operation of the MRC function, the MRC function might become allowable under a different operating environment condition. At the next step S152, the display circuit 209 is caused to make a warning display showing that the MRC function cannot be actuated under the present environment condition. At a step S153, the camera is set into the hold state HOLD.

If the noise level at a space between adjacent frames is found at the step S148 to be lower than the noise level obtained immediately after the actuation of the MRC function, the flow proceeds from the step S148 to a step S154. At the step S154, a check is made for the film transporting speed in a manner as shown in FIG. 7. If the transporting speed is found to be higher than the first or second predetermined transporting speed, the flow proceeds to a step S155. At the step S155, a check is made for a magnetic signal of the next frame. At a step S156, a check is made for the presence or absence of a magnetic signal.

Figure 4:
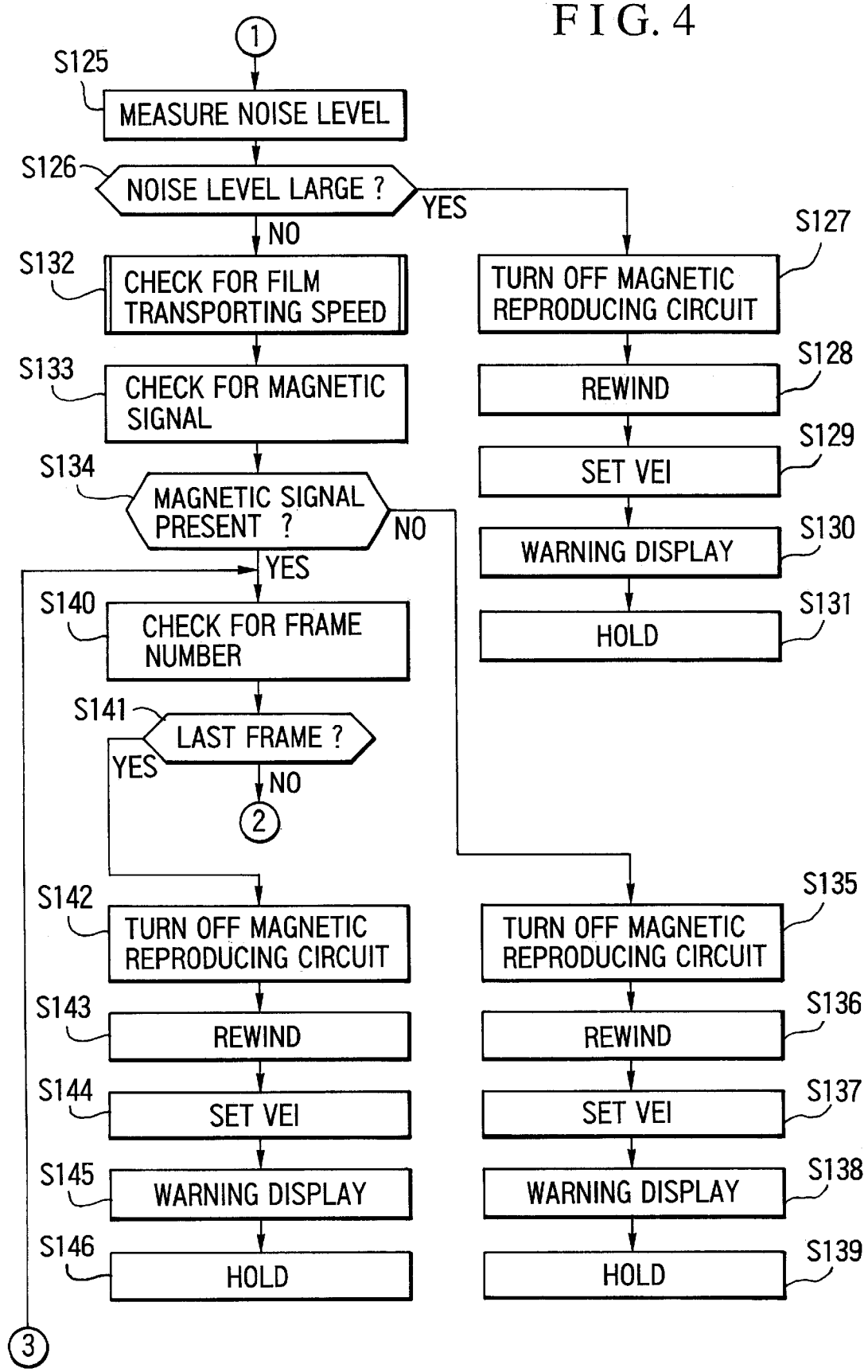
FIG. 4 is a flow chart showing the flow of operation continuing from the flow chart of FIG. 3.
Figure 5:
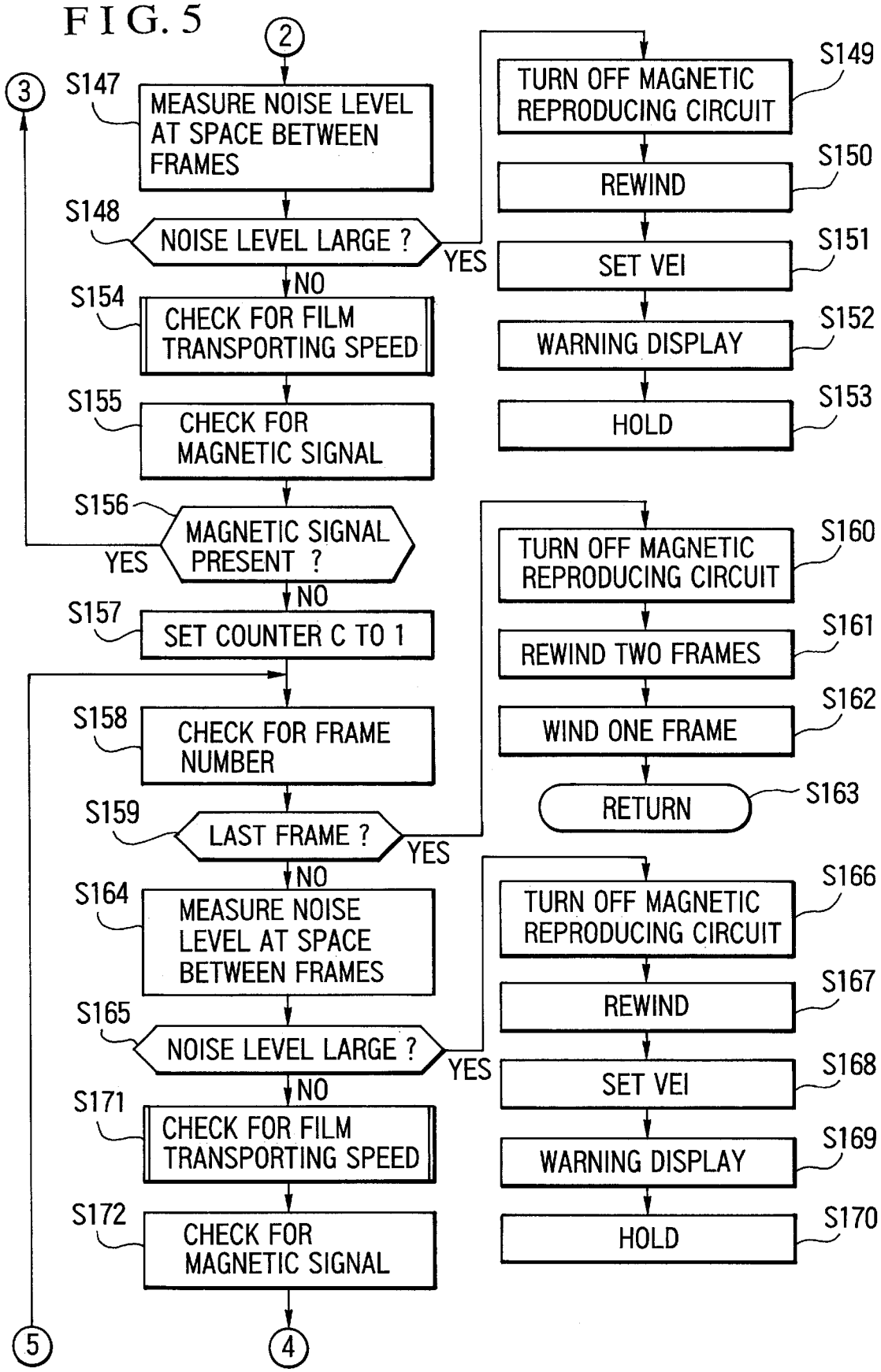
FIG. 5 is a flow chart showing the flow of operation continuing from the flow chart of FIG. 4.
Figure 6:
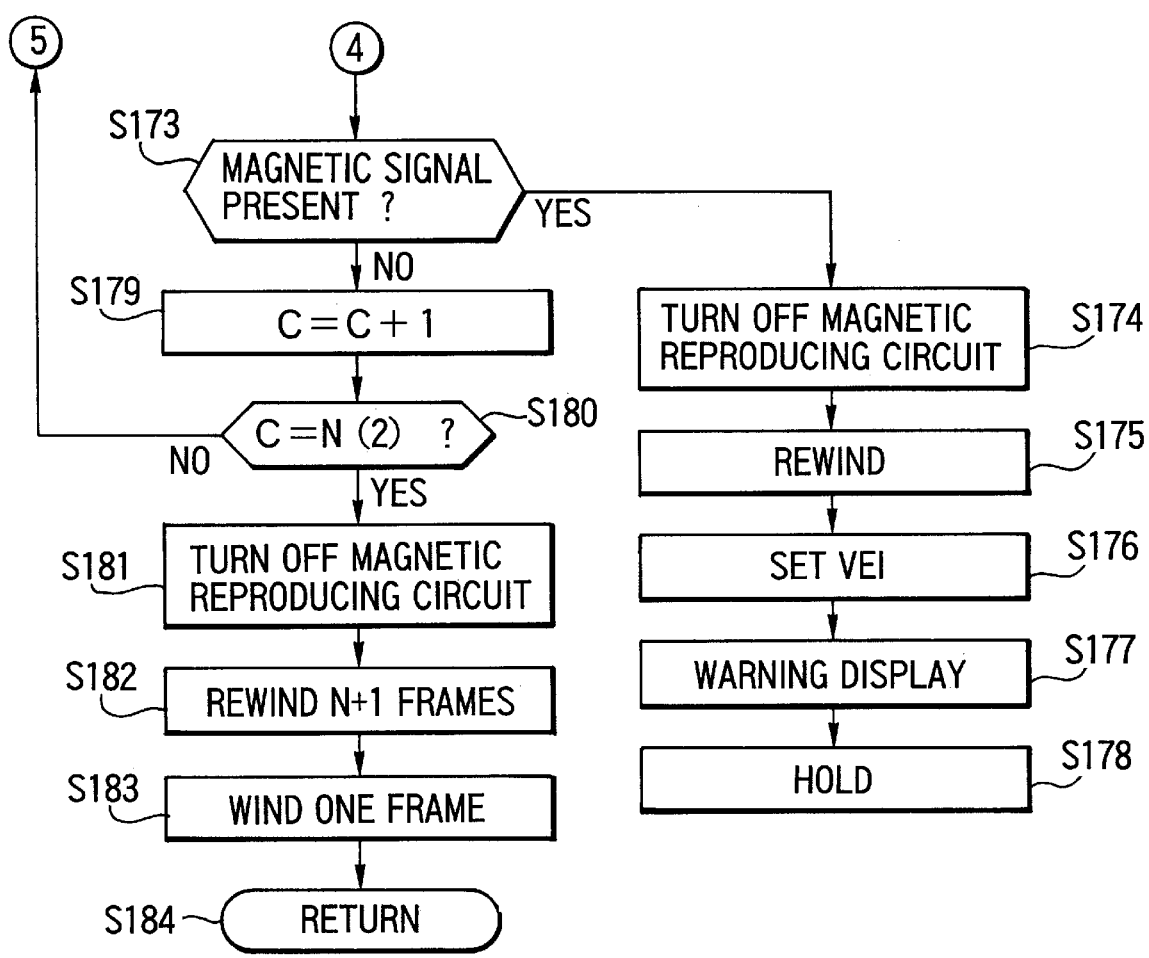
FIG. 6 is a flow chart showing the flow of operation continuing from the flow chart of FIG. 5.

If a magnetic signal is found at the step S156 to be present, the flow returns to the step S140 of FIG. 4 to make a check for the frame number and find if the current frame is the last frame at the next step S141. Therefore, as long as a magnetic signal is decided to be present, a loop of steps are repeated in the order of the steps S141-S147-S148-S154-S155-S156-S140-S141-S147- - - - -.

When the current frame is decided to be the last frame while this loop of steps is repeated, the flow proceeds from the step S141 to a step S142. At the step S142, the magnetic reproducing circuit 212 is turned off. At a step S143, the transport motor 14 is caused to reversely rotate to rewind all the frame portions of the film. At a step S144, after completion of film rewinding, the film-using state indication is set to the "exposed" state (VEI setting). The film-using state indication is thus set to the "exposed" state, because all frames including the last frame are decided to have magnetic signals. Then, the flow proceeds from the step S144 to a step S145 to cause the display circuit 209 to make a warning display to show an abnormal state. At a step S146, the camera is set into the hold state HOLD.

In a case where the absence of magnetic signals is decided at the step S156 while the above-stated loop of steps is repeated, the flow proceeds from the step S156 to a step S157. At the step S157, a counter C is caused to set the number of unexposed frames to "1". At a step S158, a check is made for the frame number. At a step S159, a check is made to find again if the current frame is the last frame. If so, the flow proceeds to a step S160. At the step S160, the magnetic reproducing circuit 212 is turned off. At a step S161, the transport motor 14 is caused to reversely rotate to rewind the film as much as two frames, because one frame has already been wound by then after the detection of the unexposed frame. At a step S162, the transport motor 14 is caused to normally rotate to wind the film by one frame, in such a way as to have the first of the unexposed frames set at the aperture position. At the next step S163, the flow returns to a standby step (not shown) at which the camera waits for a photo-taking operation.

If the current frame is found at the step S159 to be not the last frame, the flow proceeds from the step S159 to a step S164. At the step S164, a noise level at a space between adjacent frames is measured for the next frame. At a step S165, the noise level measured at the step S164 is compared with the noise level measured at the step S125. If the noise level at a space between adjacent frames is found to be larger, the noise environment of the camera is judged to have aggravated while the camera is in process of performing the MRC function and, then, the flow proceeds from the step S165 to a step S166. At the step S166, the magnetic reproducing circuit 212 is turned off. At a step S167, the transport motor 14 is caused to reversely rotate to rewind all the frame portions of the film. After completion of the film rewinding, the flow proceeds to a step S168. At the step S168, the film-using state indication is set to the "halfway exposed" state (VEI setting). In this instance, the film-using state indication is set to the "halfway exposed" state because, since the noise environment of the camera is considered to have aggravated while the camera is in process of performing the MRC function, it might be possible to carry out the MRC function under some other operating environmental condition. At the next step S169, the display circuit 209 is caused to make a warning display showing that the MRC function cannot be actuated under the current environment condition. At a step S170, the camera is set into the hold state HOLD.

Further, if the noise level at a space between adjacent frames is found at the step S165 to be lower than the noise level measured immediately after the actuation of the MRC function, the flow proceeds from the step S165 to a step S171. At the step S171, a check is made for a film transporting speed in the same manner as shown in FIG. 7. If the film transporting speed is found to be higher than the first or second predetermined transporting speed, the flow proceeds to a step S172. At the step S172, a check is made for the presence or absence of a magnetic signal for the next frame in the same manner as described above. This check for a magnetic signal is made for the purpose of verifying that a check has been correctly made for a frame decided to have no record of magnetic signal by finding that the next frame and/or frames subsequent to the next frame also have no record of magnetic signal. The number of frames to be used for this verifying purpose is decided on the basis of the reproduced output of the magnetic head, considering the individual differences of cameras in film transporting speed, circuit parameters, noise level, etc. In the case of the embodiment, the verifying action is arranged to be performed on two frames after one frame is decided to be an unexposed frame, as will be described later for a step S180. After the step S172, the flow proceeds to a step S173 shown in FIG. 6. At the step S173, a check is made for the presence or absence of a magnetic signal.

If any magnetic signal is found at the step S173 to be present, it suggests that the film cartridge is an abnormal film cartridge having some dropout of magnetic signal at an intermediate part of the film. In that case, the flow proceeds to a step S174. At the step S174, the magnetic reproducing circuit 212 is turned off. At a step S175, the transport motor 14 is caused to reversely rotate to rewind all frame portions of the film. Upon completion of film rewinding, the flow proceeds to a step S176. At the step S176, the film-using state indication is set to the "exposed" state (VEI setting). The "exposed" state is set to the "exposed" state because a frame having no record of magnetic signal is detected at an intermediate part of the film. At the next step S177, the display circuit 209 is caused to make a warning display to show the state of abnormality. At a step S178, the camera is set into the hold state HOLD.

If no magnetic signal is found at the step S173 to be present, the flow proceeds from the step S173 to a step S179. At the step S179, the count value of the counter C is incremented by one. At the next step S180, a check is made to find if the process has reached the second unexposed frame after detection of the first unexposed frame. If not, the flow of operation returns to the step S158 of FIG. 5 to make a check for the frame number and to repeat the subsequent steps in the same manner as described above until the process is found at the step S180 to have reached the second unexposed frame. The flow then proceeds from the step S180 to a step S181. At the step S181, the magnetic reproducing circuit 212 is turned off. At a step S182, the transport motor 14 is caused to reversely rotate to rewind the film to an extent which corresponds to N+1 frames, i.e., three frames in this instance, because the film has been wound as much as two frames after detection of the first unexposed frame. At the next step S183, the transport motor 14 is caused to make normal rotation to wind the film as much as one frame for the purpose of setting the first unexposed frame at the aperture position. At a step S184, the flow returns to the photo-taking standby state (not shown).

With the camera loaded with a film cartridge which contains a film in a state of having been used (exposed) only halfway, if the film transporting speed drops abruptly due to some reason, while the MRC function is in process of execution, the reproduced magnetic output of the camera would drop to become lower than a prescribed detectable threshold value. Under such a condition, some of exposed frames actually having some magnetic signal there tend to be mistaken for an unexposed frame having no magnetic signal. In that event, the mistaken frame might be set at the aperture position to result in an accidental double exposure. Such an accident is effectively prevented according to the arrangement of the embodiment disclosed.

In a case where some electromagnetic noise source such as a motor, a Braun tube of TV or a monitor of a personal computer or the like is in the neighborhood of the camera while the film is being transported after actuation of the MRC function, the noise of such a noise source might cause the magnetic head to send out a reproduced output while there is no magnetic signal. In other words, some of unexposed frames might be misjudged to be an exposed frame and the next unexposed frame might be set at the aperture position to resume a photo-taking operation from the second unexposed frame by accidentally skipping the first unexposed frame. This accident can be prevented according to the arrangement of the embodiment disclosed. In this case, a fatal accident such as a double exposure appears to be avoided. However, if the film is again rewound halfway to perform again the MRC action under a condition having no ambient noise, the unexposed frame which has been skipped last time would be set at the aperture position to have the photo-taking operation resumed from this frame. Then, frames subsequent to this frame would be double exposed. Such a serious accident also can be prevented according to the arrangement of the embodiment disclosed.

The individual components shown in schematic or block form in the drawings are all well-known in the camera arts and their specific construction and operation are not critical to the operation or best mode for carrying out the invention.

While the invention has been described with respect to what is presently considered to be a preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while the embodiment disclosed is arranged to verify an unexposed frame by checking also two frames located subsequent to the current frame. However, the invention is not limited to that arrangement. As mentioned in the foregoing, the number of frames to be used for this purpose may be suitably decided on the basis of the reproduced output of the magnetic head 7 and by considering the individual differences of cameras in film transporting speed, circuit parameters, noise level, etc.

The invention applies not only to the film cartridge of the type mentioned in the description of the embodiment but also to a cartridge containing an image recording medium other than a film.

The software arrangement of the embodiment disclosed may be replaced with the hardware arrangement.

The invention is applicable to various cameras such as a single-lens reflex camera and a lens-shutter type camera, other optical apparatus and apparatuses having the MRC function.

The invention applies to cases where either the whole of or a part of claims or the arrangement of the embodiment disclosed forms one apparatus or is used in combination with some other apparatus or as a component element of an apparatus.

In accordance with the arrangement of the embodiment disclosed, a camera can be arranged to be capable of reliably preventing such accidental double exposures resulting from mistaking an unexposed frame for am exposed from and vice versa due to aggravation of the S/N ratio of a reproduced signal due to external noises.

What is claimed is:

1. An unexposed-frame determining apparatus which determines an unexposed frame by reproducing magnetic information recorded on a film, said unexposed-frame determining apparatus comprising:

(A) a magnetic information reproducing device which reproduces magnetic information recorded on the film; and (B) a magnetic noise determining device which determines a state of magnetic noise obtained while said magnetic information reproducing device is reproducing magnetic information at a space between adjacent frames of the film.

2. An unexposed-frame determining apparatus according to claim 1, wherein said magnetic noise determining device determines a magnetic noise level as the state of magnetic noise on the basis of a magnetic signal reproduced by said magnetic information reproducing device.

3. An unexposed-frame determining apparatus according to claim 2, further comprising a warning device which gives warning when said magnetic noise determining device has determined that the magnetic noise level is higher than a predetermined level.

4. An unexposed-frame determining apparatus according to claim 1, wherein said magnetic noise determining device determines whether the magnetic noise level is higher than a predetermined level and also varies the predetermined level according to a kind of the film.

5. An unexposed-frame determining apparatus according to claim 1, further comprising a film transporting device which transports the film when said magnetic noise determining device is determining the state of magnetic noise.

6. An unexposed-frame determining apparatus according to claim 5, further comprising a film-transporting-speed determining device which determines whether a film transporting speed of said film transporting device is lower than a predetermined speed.

7. An unexposed-frame determining apparatus according to claim 1, further comprising an operation control device which performs an operation according to a result of determination by said magnetic noise determining device.

8. An unexposed-frame determining apparatus according to claim 1, wherein said unexposed-frame determining apparatus includes a camera.

* * * * *

UNITED STATES PATENT AND TRADEMARK OFFICE
CERTIFICATE OF CORRECTION

PATENT NO.    : 6,268,971 B1
DATED         : July 31, 2001
INVENTOR(S)   : Yuji Fujihara It is certified that error appears in the above-identified patent and that said Letters Patent is hereby corrected as shown below:

Column 3,
Line 37, delete "contained" and insert -- contain --.

Column 6,
Line 11, delete "As apparent" and insert -- As is apparent --.

Column 12,
Line 50, delete "am exposed from and" and insert -- an exposed frame and --.

Signed and Sealed this

Thirtieth Day of April, 2002

Attest:

Attesting Officer

JAMES E. ROGAN
*Director of the United States Patent and Trademark Office*